United States Patent [19]

Boccon-Gibod

[11] Patent Number: 4,473,529
[45] Date of Patent: Sep. 25, 1984

[54] DEVICE FOR COLLECTING PURGE LIQUIDS AND GASES IN AN INSTALLATION CONTAINING SUBSTANCES WHICH MAY POSSESS A CERTAIN DEGREE OF RADIOACTIVITY

[75] Inventor: Henry Boccon-Gibod, Villepreux, France

[73] Assignee: Framatome, Courbevoie, France

[21] Appl. No.: 256,270

[22] Filed: Apr. 21, 1981

[30] Foreign Application Priority Data

May 23, 1980 [FR] France .................. 80 11620

[51] Int. Cl.³ .......................................... G21C 19/30
[52] U.S. Cl. .................................. 376/314; 376/313; 376/310; 376/260; 55/182; 210/477; 312/1
[58] Field of Search .............. 376/308, 309, 310, 312, 376/313, 300, 314, 315, 316, 260; 55/182, 189, 159; 210/447, 477; 312/1, 31, 31.03, 31.2

[56] References Cited

U.S. PATENT DOCUMENTS

| | | | |
|---|---|---|---|
| 2,862,307 | 12/1958 | Bloomer et al. | 312/1 |
| 2,913,120 | 11/1959 | Glasby, Jr. et al. | 210/477 X |
| 3,113,913 | 12/1963 | Newton | 376/316 |
| 3,307,913 | 3/1967 | Chave | 376/300 X |
| 3,415,582 | 12/1968 | Trexler | 312/1 |
| 3,698,778 | 10/1972 | Townsend et al. | 312/1 |
| 3,890,233 | 6/1975 | Gischel . | |
| 3,894,391 | 7/1975 | Heitmann et al. | 376/315 X |
| 3,933,448 | 1/1976 | Di Peri | 55/182 X |
| 3,944,466 | 3/1976 | Marchese | 376/310 |
| 4,059,903 | 11/1977 | Piet et al. | 312/1 |
| 4,322,226 | 3/1982 | Hudec | 55/189 X |

FOREIGN PATENT DOCUMENTS

| | | | |
|---|---|---|---|
| 0026714 | 4/1981 | European Pat. Off. | 376/316 |
| 7324165 | 1/1975 | France . | |
| 2483115 | 11/1981 | France | 376/310 |
| 0025799 | 3/1978 | Japan | 376/310 |

OTHER PUBLICATIONS

"Mobile Filter in der Kerntechrik" (Mobile Filters in Nuclear Technology), Atom-Kernenergie, vol. 33, No. 1 (1979).

Primary Examiner—Richard E. Schafer
Assistant Examiner—Daniel Wasil
Attorney, Agent, or Firm—Pollock, Vande Sande & Priddy

[57] ABSTRACT

A self-contained and movable device for collecting purge liquids and gases in an installation containing radioactive substances, comprising a detachable and transportable vessel (5) of small dimensions, a closure of the purge outlet (2) which can be operated from outside the vessel (5), a movable unit (7) for drawing off and collecting the purged liquids and gases, and a flexible tube (6) connecting the vessel (5) and the movable drawing-off and collecting unit (7). The invention applies particularly to the purging of the cooling circuit under shut-down conditions of a pressurized water nuclear reactor.

6 Claims, 2 Drawing Figures

DEVICE FOR COLLECTING PURGE LIQUIDS AND GASES IN AN INSTALLATION CONTAINING SUBSTANCES WHICH MAY POSSESS A CERTAIN DEGREE OF RADIOACTIVITY

FIELD OF THE INVENTION

The invention relates to a device for collecting purge liquids and gases in an installation containing substances which may possess a certain degree of radioactivity, such as the shut-down cooling circuit of a pressurized water nuclear reactor.

BACKGROUND

In a nuclear power station, it is necessary to be able to purge the circuits which are not used in a continuous manner, such as the shut-down cooling circuit and, more generally, all the parts of the circuits which can be isolated.

It is also necessary to be able to purge those enclosures which are likely to hold liquids or gases which are contaminated by radioactive substances coming from the reactor core.

This purging operation can be carried out during cold close-down periods, and requires certain precautions to be taken, as the liquids or gases remaining in the circuits being purged are generally contaminated by radioactive substances coming from the reactor core.

At present, collecting networks are used which are connected directly to the various components of the piping system and to the pieces of equipment which are being purged. These networks are provided with inspection windows which permit visual inspection of the flow during purging and are connected in a permanent manner to the circuits from which they are intended to collect the purged liquids and gases.

As the points in the piping system where purging or drainage has to be carried out are many in number and are distributed throughout the circuit to be purged, the circuit for collecting the removed liquids and gases is generally complicated and of appreciable length.

The length of piping constituting this network for collecting such liquids and gases rapidly becomes contaminated since it is only rarely that fluids pass through them, and thus conditions are created under which it is fairly easy for radioactive deposits to be formed there. Some of these pipes become contaminated to such a degree that they have to be replaced during the life of the power station.

When the drainage of the liquids contained in the piping or the equipment to be purged has been completed, the section of piping which has been purged is filled with air, which, when the piping system is being filled, escapes through vents, carrying with it a small amount of liquid which contains radioactive products.

It is consequently necessary to send this air through a phase separator before releasing the gaseous phase into the atmosphere of the building.

The collected contaminated liquids are sent to an installation for treating the contaminated effluent in which the radioactive products are eliminated.

Installations for collecting the drained liquids and gases in the circuits constituting the equipment of nuclear power stations are consequently very complex and involved and increase the constructional costs of the latter.

The object of the invention is consequently to provide a device for collecting the purged liquid and gases in an installation containing substances which may possess a certain degree of radioactivity, and including closable purging means distributed at different locations in the installation, such device making it possible to avoid the use of complex piping networks connected in a permanent manner to the installation.

In order to achieve this object, the self-contained and movable collecting device comprises:

(a) a removable and transportable enclosure of small dimensions which can be connected to the purging means of the installation, in such a way that the internal volume of the enclosure is isolated from the external medium;

(b) a means for opening or closing the purging means which can be operated from outside the enclosure for isolating the inside of the enclosure from the installation to be purged or putting these two in communication;

(c) a movable unit for drawing off and collecting the purged liquids and gases, including at least one collecting reservoir, a suction means arranged inside this reservoir, a means for evacuating gases into the atmosphere and a connecting component for evacuation of the purged liquids into a treatment installation;

(d) a flexible connecting pipe between the enclosure and the drawing-off and collecting unit.

A description will now be given, with reference to the attached drawings, of one embodiment of a device for collecting purge liquid and gases which can for example, be used in a pressurized water nuclear power station, for purging the cooling circuit of the shut-down reactor.

DETAILED DESCRIPTION OF AN EMBODIMENT

Figure 1:
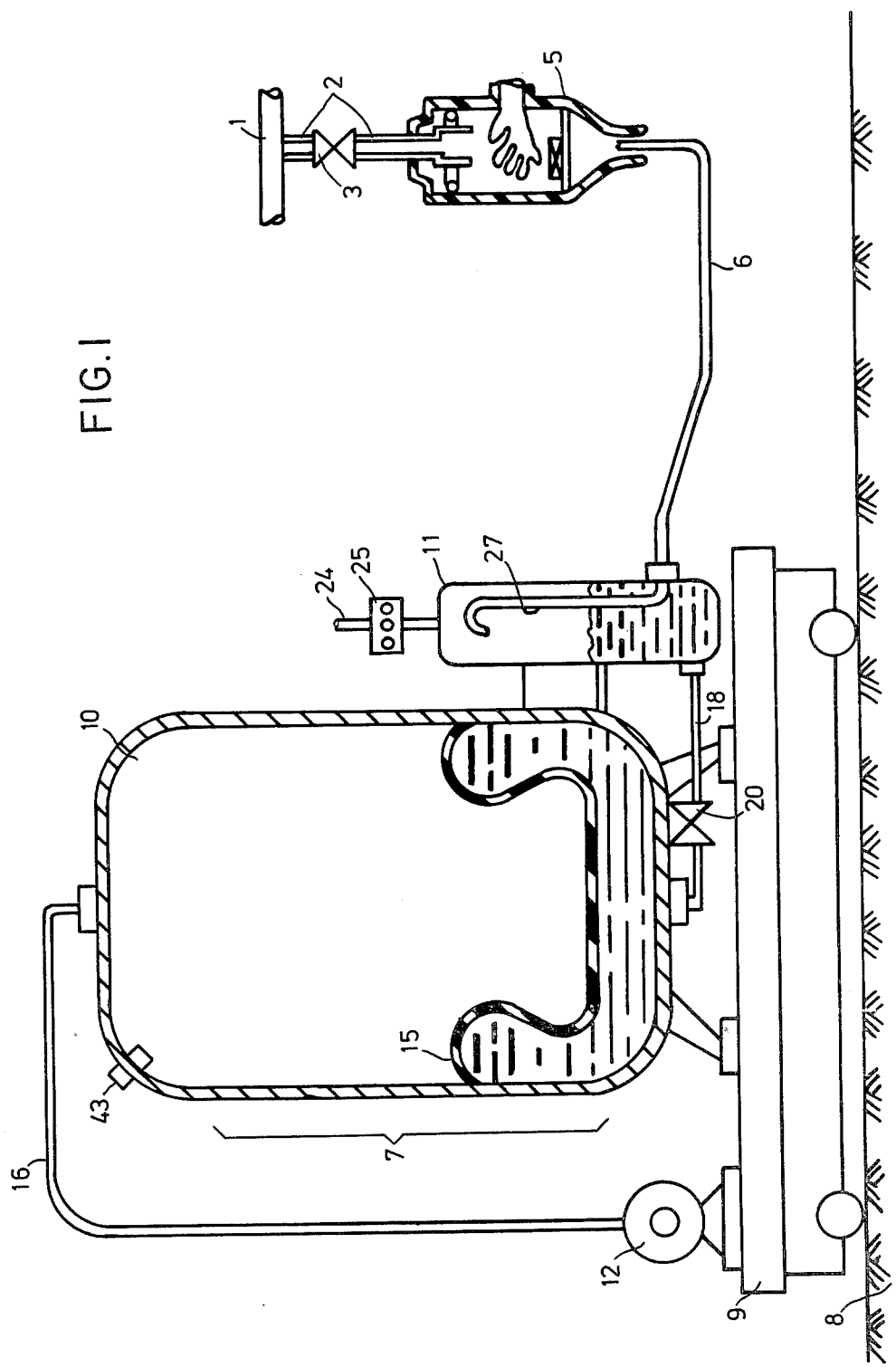
FIG. 1 shows the device according to the invention partially in section.

With reference to FIG. 1, a section of conduit 1 of the cooling circuit of the shut-down reactor can be seen which is tapped by a purging means made up by a length of pipe 2 and a valve 3.

An enclosure 5 of small dimension is connected in a sealed manner to the length of pipe 2 downstream of the valve 3, this enclosure 5 making it possible to connect up the collecting device to the purging means provided on the conduit 1.

The enclosure 5 is connected, by a flexible tube 6, to a drawing-off and collecting unit 7, which can be moved over the floor 8 of the reactor building.

This drawing-off and collecting unit is made up by a trolley 9, to which a reservoir 10, a separating and venting unit 11 and a vacuum pump 12 are fixed.

The internal volume of the reservoir 10 is separated into two parts by a flexible membrane 15, the upper part of the vessel being connected by a pipe 16 to the vacuum pump 12 and the lower part being connected to the lower part of the phase separator 11, by means of a length of pipe, 18.

A valve 43 allows air to be introduced into the vessel 10 in order to release the vacuum in the upper part of the vessel. A valve 20 is provided for closing off communication between the phase separator 11 and the lower half of the vessel 10.

The upper half of the phase separator 11 is provided with a gas venting device 24, which is in communication with the inside of the container for venting the gases which have been separated from the liquid, via a filter 25.

The flexible pipe 6 is extended inside the gas separator by a vertical crook-shaped pipe 27 which allows the gas and liquid to be separated as the liquid falls to the bottom of the phase separating container 11.

Figure 2:
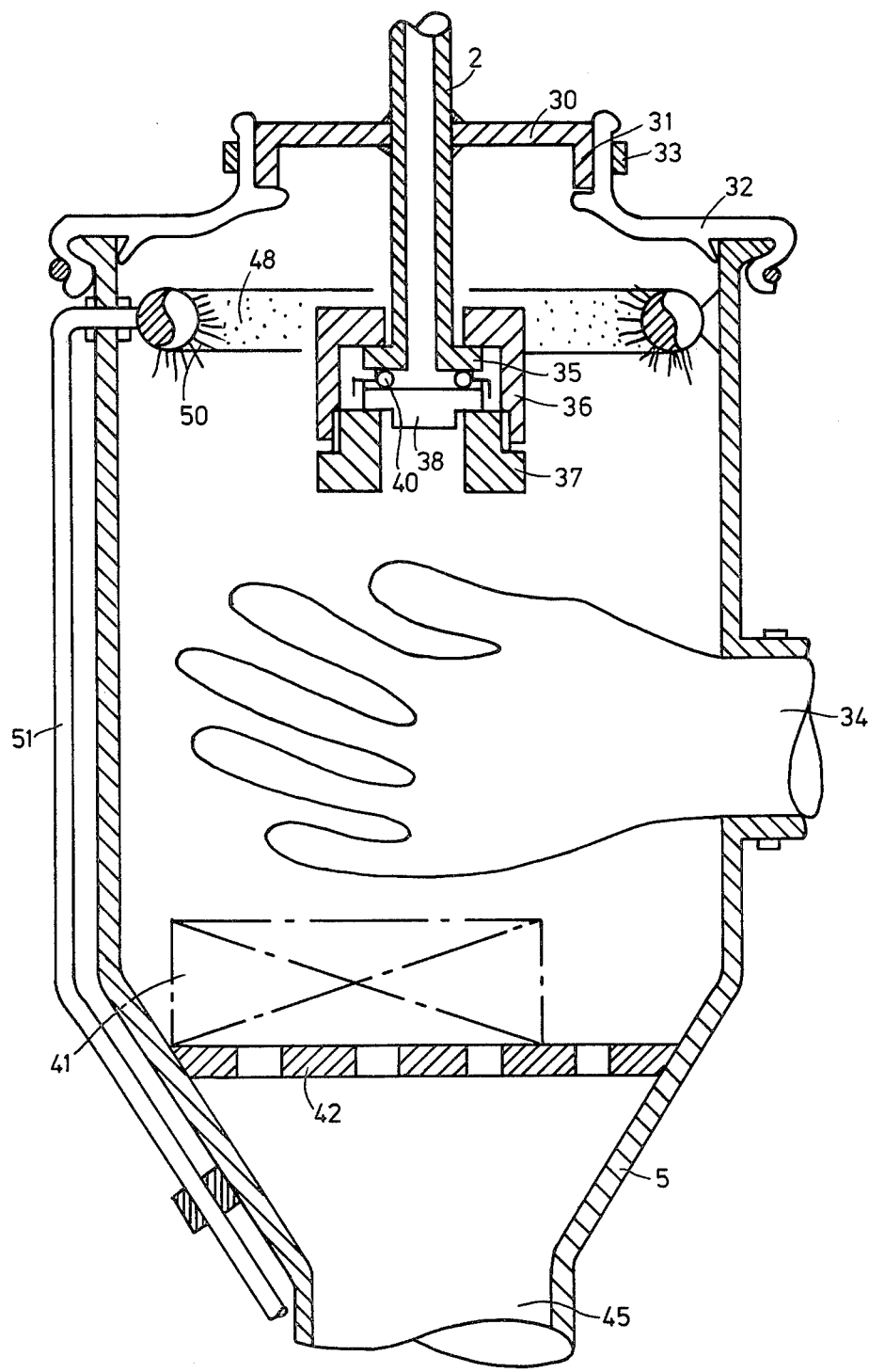
FIG. 2 is a sectional view on an enlarged scale of the enclosure for connecting the device to a purging means provided in the reactor cooling circuit.

In FIG. 2, the vessel 5 can be seen which allows the device for collecting the removed fluids to be connected to the purging means provided on the conduit 1 of the reactor cooling circuit.

The short length of piping 2, constituting the purge means for the section of conduit 1, has a plate 30 fixed to it which includes an abutment region 31 and to which it is possible to fix, in a sealed manner, a lip 32 of a flexible material, constituting the upper end part of the vessel 5. A clamping ring 33 makes it possible to fix, in a sealed manner, the vessel 5 onto the base of the short length of pipe 2, constituting a purging means for the conduit 1.

The vessel 5 is made of a flexible or rigid material and includes transparent regions which make it possible to follow the progress of the purging operation.

The vessel 5 is provided with two manipulating gloves 34 which are fixed in a sealed manner into openings in the vessel 5.

The end of the short length of pipe 2 which is arranged inside the vessel 5, when the collecting device has been connected up to this length of pipe includes a device for providing a sealed closure which can be operated by an operator from outside the vessel 5, making use of the gloves 34.

This device for providing a sealed closure bears against a shoulder 35, constituting the lower part of the short length of pipe 2 and includes a sleeve 36 and a plug 38 against which the upper part of the screw 37 bears.

A sealing gasket 40 is inserted between the plug 38 and the shoulder 35. Closing and release of the sealed closure for the length of pipe 2 can be carried out by the operator with the aid of a tool 41, which is placed inside the vessel 5 on a filtration grid 42, which has the dual purpose of providing a support for the tool and providing a filter element for the liquids removed, which penetrate into the vessel 5.

This vessel 5 has, at its lower portion, an outlet 45 which is connected to the flexible pipe 6.

A sprinkling device is also arranged inside the vessel 5 which provides for decontamination of the components of the closure device for the length of pipe 2, as well as decontamination of the vessel 5 and of the devices which this vessel may contain.

The annular conduit 48 carrying sprinkling nozzles 50 is connected to a pipe 51 through which it is supplied with a decontamination solution which is held in a reservoir (not shown), and is sent under pressure through the pipe 51.

An operation for collecting liquids and gas originating from the purging of the cooling concuit of a nuclear reactor will now be described.

The complete device is brought to a position where it is close to a short length of pipe 2, constituting a purging means for a section of the conduit.

Displacement of the apparatus is easy thanks to the provision of the trolley 9, which allows for transport of all the components constituting this device, the vessel 5 in this case being in a position where it is not connected to a purging means 2.

The length of the pipe 6 is approximately 5 meters, which makes it possible, by arranging the trolley at the desired location, to reach all the points provided for purging on the cooling circuit of the shut-down reactor.

The operator has available inside the glove box a complete replacement assembly for closing off the short length of pipe 2, this replacement assembly comprising a plug, such as that shown at 38, a sealing element, such as that shown at 40, and a screw, such as that shown at 37.

A tool for disassembling the closure element from the short length of pipe such as that shown at 41, has also been placed inside the vessel.

The purging pipe 2 is closed by a complete assembly such as that shown in FIG. 2. The vessel 5 which is provided with suitable handles so that it may be manipulated is then brought to a position where it is in the region of the bearing surface 31 of the plate 30 so that the flexible lip 32 becomes applied to this bearing region 31.

Then connection between the vessel and the short length pipe 2, is established using the quick action clamping sleeve 33.

The operator then carries out disassembly, using the gloves 34 and the tool 41 of the closure device which is in position at the end of the short length of pipe 2. The operator then places the screw 37 and the plug 38 as well as the seal 40 on the filtration grid 42 which provides an area where these closure components may be stored.

The valve is then opened so as to carry out purging of the section 1 of conduit.

If the difference in level between the point at which purging is being done and the reservoir 10 is adequate, it will not be necessary to start up the vacuum pump which makes it possible to provide a suction effect in the lower part of the collecting reservoir 10, via the intermediary of the flexible membrane 15. In the contrary case, it will be necessary to start up the pump 12, which can be done using a control box located close to the vessel 5, constituting the glove box, or actually inside it.

As the vessel is partly transparent, it is possible to follow the drainage operation of the conduit by simple visual checking.

The removed liquid flows through the length of pipe 2 to the inside of the vessel 5, and is then filtered by the grid 42 and leaves the vessel 5 by way of the outlet passage 45 which is joined to the pipe 6.

The removed liquid flows into a phase separator 11, after having passed through pipe 6.

The liquid which has collected in the lower part of this phase separator is then forced into the lower part of the reservoir 10 either as a result of suction due to the creation of a vacuum in the upper part of reservoir 10, or as a result of natural flow if a sufficient difference in level exists between the conduit which is being drained and the reservoir 10.

When the removal of liquid has been finished, the length of pipe 2 is closed off with the new closure element assembly held in the vessel 5.

The assembly, which has been dismounted before the purging operation was commenced, is decontaminated by making use of the sprinkling arrangement 48.

When the entire conduit system has been drained and when it is intended to start the re-filling of this conduit system, collection of the air filling the conduit system is carried out by fixing the vessel 5 to the end of the conduit arrangement by connecting it to a vent pipe which includes a closure arrangement identical to the one used for the short pipes used for draining the liquid.

As the piping system becomes filled, the air is driven out via the vent pipe and passes into the vessel 5, and then passes through the flexible tube 6 into the phase separator 11. In the phase separtor 11, the liquid which has been carried in the air falls into the lower part of the container while the air itself, after passing through the filtering wall 25, leaves by the vent pipe 24, the cock of which has been opened. The air is consequently discharged into the atmosphere of the building while the contaminated liquid is eliminated in the same way as was the case with the drained liquid which is collected in the lower part of the reservoir 10, before being sent to a retreatment installation.

In order to do this, at the end of an operation for venting and removing purge liquids in the conduit system the collecting device is transferred to a position close to a circuit for effluent treatment which allows the effluence to be led to a treatment and decontamination unit.

The invention is not limited to the embodiment which has just been described, but rather includes all variations of it.

Thus, it may be possible to use a remote control device as a replacement for the gloves in the vessel 5, and one might use a manner of fixing the vessel 5 on the short pipe 2 different from the manner of fixing which has been envisaged, such fixing being done using a screw fitting or a bayonet fitting.

It will be seen that the main advantages of the device according to the invention are the avoidance of a complex and cumbersome fixed circuit and the enablement to carry out the collecting operations for the liquid and gases in the conduit system in a rapid manner and in complete safety.

A further advantage of the device which has been described is that there is no pump in the purge circuit, and that drawing-off of the contaminated substances is done by means of a sealed flexible membrane.

Finally, the device according to the invention can be used not only in the case where it is desired to purge the conduit of a pressurized water nuclear reactor, but also where it is necessary to purge any piping system or equipment which may contain radioactive substances.

I claim:

1. Device for collecting radioactive purge liquids and gases in a nuclear plant, said nuclear plant including closable purging pipes distributed at different locations of said plant, said device consisting of a self-contained and movable apparatus for successive connection to an outlet end of each of said purging pipes, comprising
   (a) a movable unit for drawing off and collecting said purged liquids and gases, including at least one collecting reservoir (10), means (12) for creating suction within said reservoir (10), means (11) for evacuating gases to atmosphere, and a connection component for evacuation of the purged liquid into a treatment installation;
   (b) a removable enclosure (5) of sufficiently small dimensions so that it can be handled by a single operator and connected to said purging pipe (2) in such manner that the internal volume of said enclosure (5) is sealed, and that the outlet end of said purging pipe is inside said enclosure when connected;
   (c) means (36, 37, 38, 40) for opening or closing said purging pipes (2) which can be operated from outside said enclosure (5) for selectively isolating or communicating the inside of said enclosure (5) with respect to the installation to be purged; and
   (d) a flexible connecting pipe (6) between said enclosure (5) and the drawing off and collecting unit (10, 11).

2. Collecting device according to claim 1, wherein said movable unit for drawing off and collecting the liquids and gases includes, on a transport trolley (9), a reservoir (10) the internal volume of which is separated into two parts by a flexible membrane (15), one part of said reservoir being connected by a pipe (16) to a vacuum pump (12) mounted on said trolley (9) and the other part being connected by a pipe (18) to a container (11) for collecting the purged liquids and gases.

3. Collecting device according to claim 2, wherein said container (11) for collecting the purged liquids and gases comprises a phase separator the lower part of which is connected to the lower part of said reservoir (10) and the upper part of which is connected to a venting device (24) for evacuation of the gases to atmosphere.

4. Collecting device according to claim 3, comprising a filtering element (25) arranged between said container (11) for collecting the gases and the liquids and said venting device (24).

5. Collecting device according to any one of claims 1 to 4, wherein said removable enclosure cmprises a glove box the wall of which is at least partially transparent, and which can be connected to said purging means by a flexible lip and a clamping collar.

6. Collecting device according to claim 5, wherein said enclosure (15) includes a decontamination device comprising a sprinkler means.

* * * * *